United States Patent [19]

Nonoshita

[11] Patent Number: 5,761,864
[45] Date of Patent: Jun. 9, 1998

[54] THERMALLY INSULATED BUILDING AND A BUILDING PANEL THEREFOR

[76] Inventor: Tadamichi Nonoshita, No. 3-24, Ohmagari 2-chome, Samukawa-cho, Kouza-gun, Kanagawa-ken, Japan

[21] Appl. No.: 519,149

[22] Filed: Aug. 24, 1995

[30] Foreign Application Priority Data

Aug. 31, 1994 [JP] Japan .................. 6-229046

[51] Int. Cl.⁶ .................. F24F 7/02; E04B 1/74
[52] U.S. Cl. .................. 52/302.3; 52/302.4; 52/95; 52/198; 52/199; 52/606; 454/185; 454/186
[58] Field of Search .................. 52/302.1, 302.3, 52/302.4, 95, 198, 199, 606; 454/185, 186

[56] References Cited

U.S. PATENT DOCUMENTS

| 761,711 | 6/1904 | Redfers | 52/302.4 |
|---|---|---|---|
| 964,160 | 7/1910 | Hammett . | |
| 1,568,997 | 1/1926 | Blount | 52/302.4 |
| 2,427,780 | 9/1947 | Haines | 454/185 |
| 2,641,449 | 6/1953 | Antony | 454/185 X |
| 2,969,617 | 1/1961 | Micheler | 52/302.3 |
| 3,537,378 | 11/1970 | Daly | 52/199 X |
| 4,295,415 | 10/1981 | Schneider | 52/302.3 X |
| 4,642,958 | 2/1987 | Pewitt | 52/302.3 |

FOREIGN PATENT DOCUMENTS 740746  1/1933  France .................. 52/302.3

*Primary Examiner*—Robert Canfield
*Attorney, Agent, or Firm*—Pearne, Gordon, McCoy & Granger LLP

[57] ABSTRACT

A building comprising an exterior wall having an outer air convection layer provided therein with an lower opening communicating with an atmosphere and an upper opening communicating with an atmosphere and an inner air convection layer provided therein with a lower opening communicating with an atmosphere and an upper opening communicating with a garret space, which in turn communicates through a ridge venting hood with an atmosphere.

12 Claims, 17 Drawing Sheets

THERMALLY INSULATED BUILDING AND A BUILDING PANEL THEREFOR

BACKGROUND OF THE INVENTION

This invention relates to a building of thermal insulating construction comprising an exterior wall and/or a roof board such as roof batten having an improved thermal insulation and a building panel therefore.

Of late, a building tends to have improved air tightness based on a cooling and/or heating equipment provided in the building. This causes humidity to adhere to wall material (wood material) of the exterior wall or the like because dew is caused by difference between room temperature and atmosphere temperature when the cooling and/or heating equipment is operated. This tends to promote rotting of wooden material. Improvement of thermal insulation of the exterior wall and/or the roof board such as roof batten in order to reduce energy for cooling and/or heating.

There has been disclosed in Japanese Utility Model Application Laying-Open No. 61-370307 (No.37307/1986) a building having an air convection space between an exterior wall and thermally insulating material to prevent dew from adhering to the exterior wall and energy on cooling and/or heating from being wastefully consumed.

A building of such construction comprises an exterior wall such as finishing material provided in a spaced manner from a thermally insulating material so as to form an air space or layer therebetween and natural and/or forced ventilation means provided in the building whereby an air flows into the air space through an air inlet provided at a lower end of the exterior wall and flows out thereof through an air outlet provided at an upper end of the exterior wall and/or in a garret.

However, since the conventional building of such thermal insulating construction has only one layer of air space provided in the exterior wall, an air in the air space tends to be heated by an atmosphere temperature through the exterior wall. Thus, the air in the air space between the exterior wall and the thermally insulating material cannot effectively hold the temperature difference between the outside and inside of the building. This fails to improve thermal insulation of the building.

In addition thereto, the conventional building of such thermal insulating construction is adapted to introduce the convective air into the garret space and discharge it out thereof, but since the roof board such as roof batten tends to be thermally affected by the atmosphere, room temperature will be adversely affected by radiant heat from the roof board.

There has been disclosed in Japanese Patent Application Laying-Open No. 4-176937 (176937/1993) a building of thermally insulating construction having two air spaces provided between an exterior wall and a thermally insulating material. Since two inner and outer air layers in the air spaces have temperature gradient, room atmosphere will be thermally affected by the atmosphere temperature in a more effective manner. Thus, the building will have more improved thermal insulation effect than one having only one air space therebetween.

However, in the building of thermal insulating construction disclosed in the Japanese Patent Application, the two air spaces thereof has been formed by building up the wall construction including the exterior wall and the thermally insulating material so that the inner air space is formed between the thermally insulating material and a middle wall material while the outer air space is formed between the middle wall material and the exterior wall. Thus, it will be noted that building up the building is more complicated, which causes the building cost to be more expensive.

Furthermore, it should be noted that the air in the two air spaces flows in the garret space and mixed with each other therein. The air in the outer air space tends to be heated by hot outdoor air or cooled by cool outdoor air. Thus, as the heated or cooled air in the outer air space is mixed with the air in the inner air space which can barely be affected by the ambient temperature so as to be originally cool, the relatively cooled air from the inner air space is heated by the air in the outer air space and the heat tends to be stored and confined in the garret space. This causes a room or rooms adjacent to the roof to have lower thermal insulation. The air in the garret space flows out thereof through an air outlet in a ridge ventilating hood and/or flows back through an air duct in the building. The air flowing back through the air duct disadvantageously brings the ambient temperature into the room or rooms.

SUMMARY OF THE INVENTION

Accordingly, it is a principal object of the invention to provide a building of thermally insulating construction having improved thermal insulation of an exterior wall.

It is another object of the invention to provide a building of thermally insulating construction adapted to be built-up more easily It is further object of the invention to provide a building of thermally insulating construction adapted to have thermal insulation of garret space more improved without any heat stored and confined therein.

It is another object of the invention to provide a building panel having thermal insulation more improved and adapted to be built-up more easily.

In accordance with one aspect of the present invention, there is provided a building comprising an exterior wall having a plurality of air convection layers provided in said exterior wall individually from each other and ventilation means to ventilate said air convection layers.

In accordance with another aspect of the present invention, there is provided a building comprising an exterior wall having a plurality of air convection layers provided in said exterior wall individually from each other and an air confinement layer provided in said exterior wall between adjacent air convection layers and ventilation means to ventilate said air convection layers.

The ventilation means may include air inlets provided at a Lower end of the exterior wall and through which air flows into the air convection layers.

The ventilation means may include an outside air outlet provided at an upper end of the exterior wall and communicating with the outermost air convection layer so that the air in the outermost air convention layer flows out thereof and an inside air outlet communicating through a garret space with the remaining air convection layer so that the air in the remaining air convection layer flows out thereof.

The ventilation means may include a fan serving to forcibly discharge air through the inside air outlet out of the remaining or inner air convection layer and having louver boards provided so as to open and close an air passage thereof.

In accordance with a further aspect of the present invention, there is provided a building comprising a roof board having a plurality of air convection layers provided in said roof board individually from each other and ventilation means to ventilate said air convection layers.

In accordance with a further aspect of the present invention, there is provided a building comprising a roof board having a plurality of air convection layers provided in said roof board individually from each other and an air confinement layer provided in said roof board between adjacent air convection layers and ventilation means to ventilate said air convection layers.

The ventilation means may include air inlets provided at a lower end of the roof board and through which air flows into the air convection layers.

The ventilation means may include an outside air outlet provided at an upper end of the roof board and communicating with the outermost air convection layer so that the air in the outermost air convection layer flows out thereof and an inside air outlet provided in a ridge ventilating hood and communicating through a space within the ridge ventilating hood with the inside air convection layer so that the air in the remaining or inner air convection layer flows out thereof.

The ventilation means may include a fan serving to forcibly discharge air through the inside air outlet out of the inner air convection layer and having louver boards provided so as to open and close an air passage thereof.

In accordance with another aspect of the invention, there is provided a building panel comprising a panel body having a plurality of air convection layers provided therein.

In accordance with a further aspect of the invention, there is provided a building panel comprising a panel body having a plurality of air convection layers provided therein and an air confinement layer provided therein between adjacent air convection layers.

The building panel may be for an exterior wall. The building panel for the exterior wall may have the innermost air convection layer formed of longitudinal grooves so that projections formed between adjacent longitudinal grooves serves as furring strips.

The building panel may be for a roof board such as batten material.

With a plurality of air convection layers provided in an exterior wall or a roof board, although air in the outermost air convection layer is heated by radiant heat through the exterior wall or the roof board, the inner air convection layer or layers have air which is never affected by atmosphere temperature through the outermost air convection layer. Thus, it will be noted that the air in the inner air convection layer or layers serve to cut an room or rooms from the atmosphere temperature.

Since the outermost air convection layer serves to absorb and discharge radiant heat on the outer surfaces of the exterior wall and the roof board such as roof batten together with the convective air therein, the radiant heat never affects the room temperature. Thus, it will be noted that this improves thermal insulation of the exterior wall and/or the roof board in association with the inner air convection layer or layers.

Since the air in the outermost air convection layer in the exterior wall which tends to be affected by radiant heat is discharged out of the exterior wall without entering the garret space and therefore never mixes with the air in the inner air convection layer or layers in the garret space, heat from the exterior wall is never confined within the garret space. Thus, a room or rooms adjacent to the roof are never affected by the atmosphere temperature, which provides a comfortable occupation space or spaces.

With the air confinement layer provided between the adjacent air convection layers and serving to confine air therein, the air in the inner air convection layer is prevented by the air confinement layer from being adversely affected by the air in the outermost air convection layer which is in turn affected by the atmosphere temperature. In addition thereto, the air in the air confinement layer serves as thermal insulating means. As a result, the thermal insulation of the exterior wall and/or the roof board will be more improved.

With the construction of the invention, dew is never produced on the exterior wall and/or the roof board even though the building has air tightness. This effectively prevents building materials from rotting. Also, this maintains the temperature difference between the outside and inside of the building which restrains energy of the cooling and/or heating equipment from being wastefully consumed.

With the plurality of air convection layers provided in the exterior wall or the roof board so that it is panel-like, the air convection layers or spaces are not required to be assembled in a building site, which enables a method of assembling a building to be simpler. In this manner, since a cost of construction of the building will be prevented from being expensive, the thermally insulated building can be more economically provided.

With the building panel for the exterior wall having the innermost air convection layer formed of longitudinal grooves so that projections formed between adjacent longitudinal grooves serve as furring strides for the building panel, workers are not required to prepare and assemble furring strips in the building site, which enables assembling the building to be more effectively made.

BRIEF DESCRIPTION OF THE DRAWINGS

The above and other objects and features of the invention will be apparent from the description of the embodiments of the invention taken along with the accompanying drawing in which.

DETAILED DESCRIPTION OF THE EMBODIMENT

Figure 1:
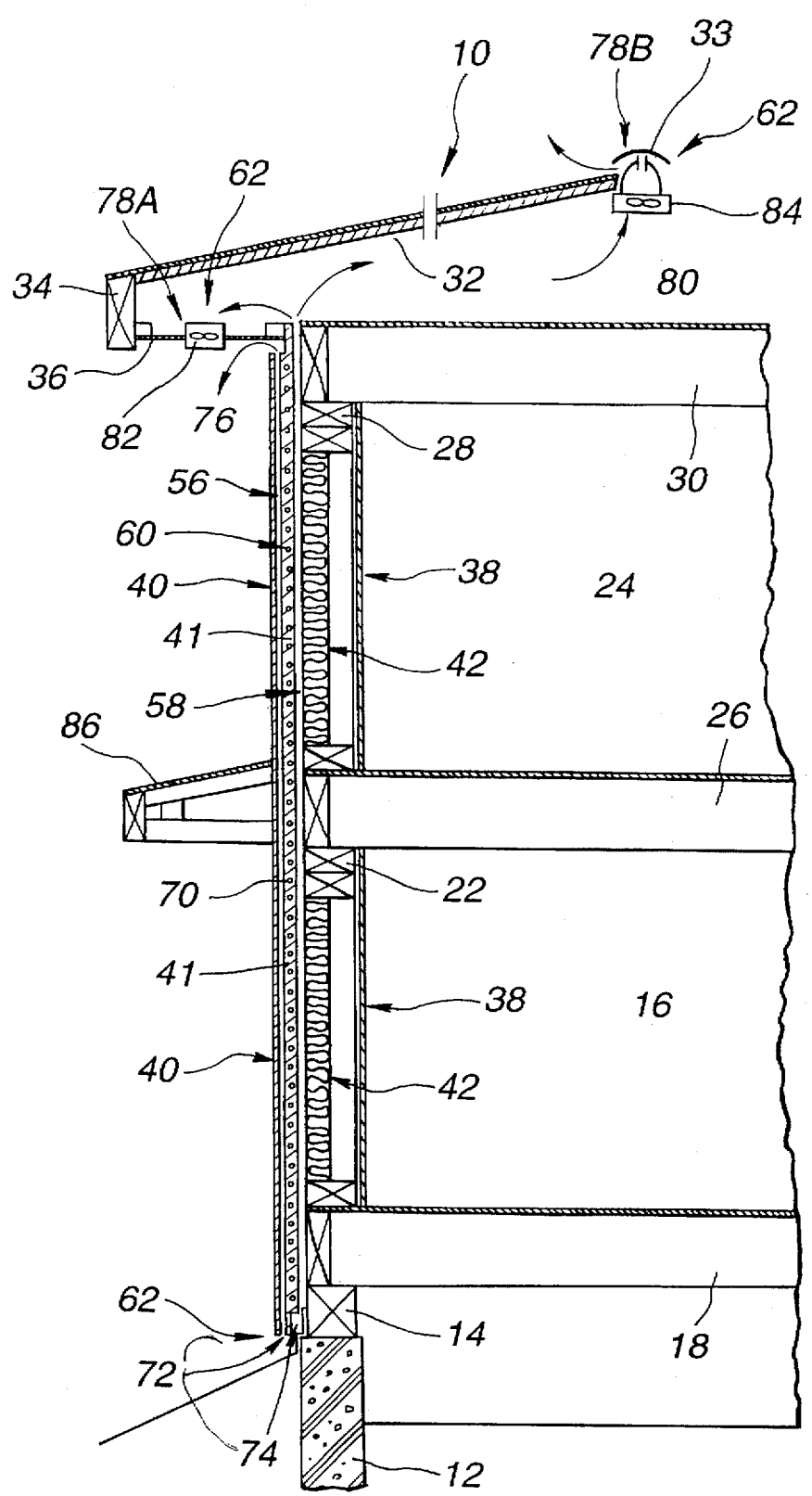
FIG. 1 is a schematically sectional view of a thermally insulated building constructed in accordance with one embodiment of the invention.
Figure 2:
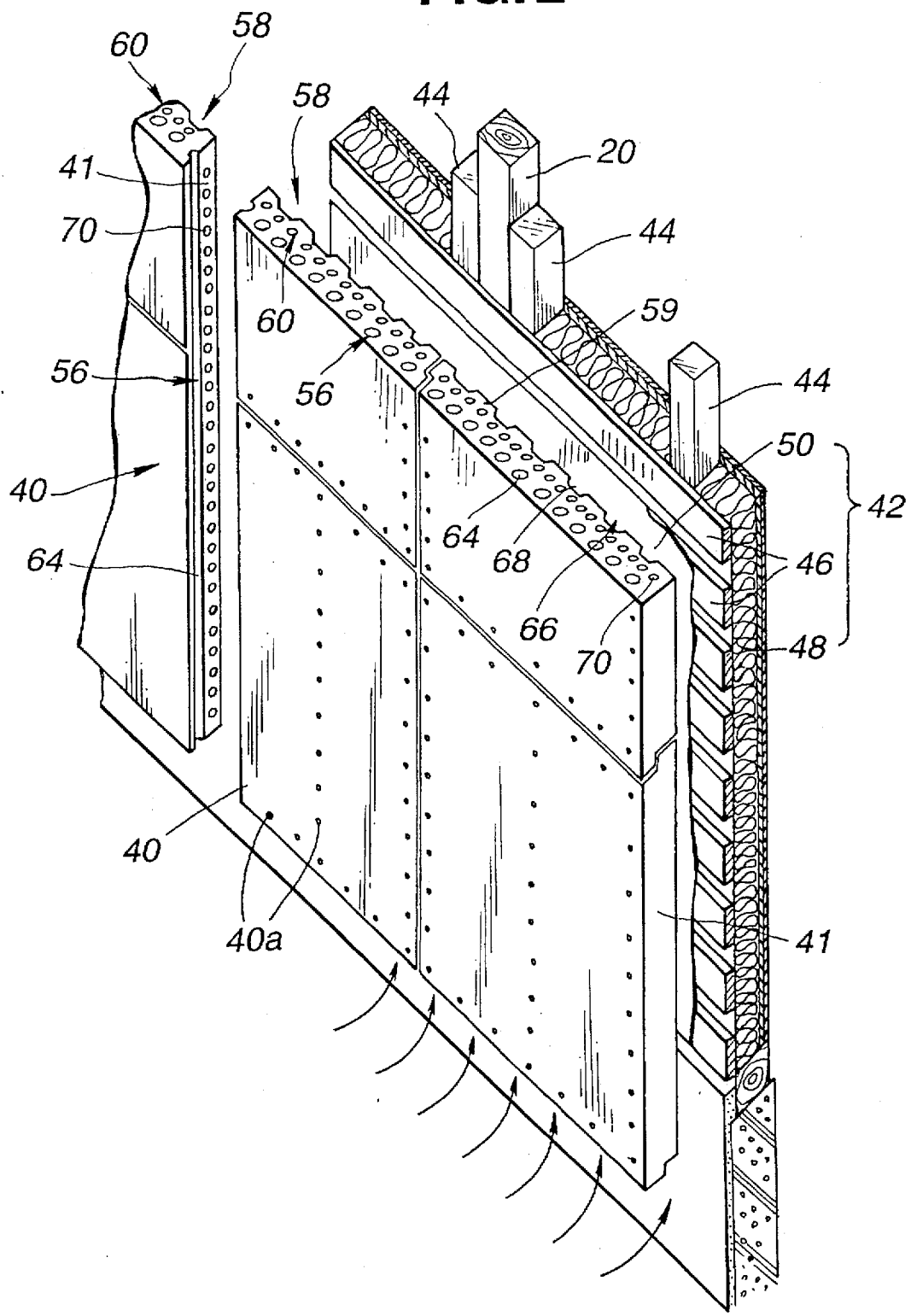
FIG. 2 is an enlarged perspective view of lower portions of an exterior wall and thermally insulating panel used for the building of FIG. 1 and assembled with each other.
Figure 4:
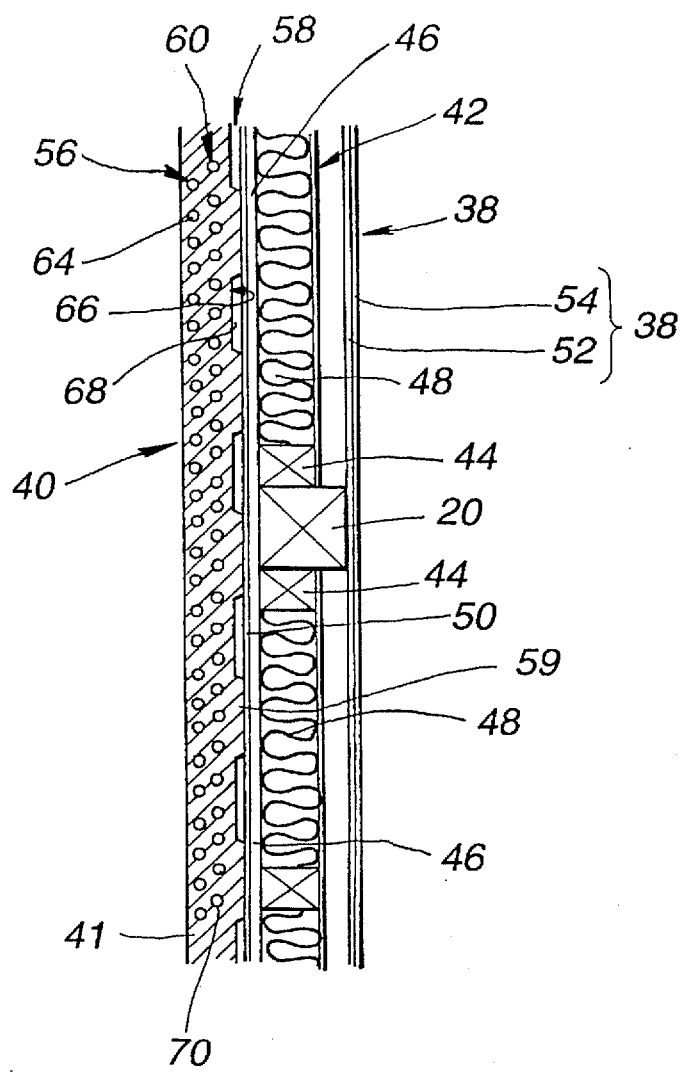
FIG. 4 is an enlarged cross sectional view of an exterior wall and a thermally insulating panel used for the building of FIG. 1 and assembled with each other.

Referring now to FIG. 1, there is shown a thermally insulated building 10 constructed in accordance with one embodiment of the invention. In the illustrated embodiment, the thermally insulated building 10 is shown to be two storied wooden building. The thermally insulated building 10 comprises a floor panel 18 for a first floor habitable room or rooms 16 mounted on a ground sill 14 which is in turn provided on a concrete foundation 12, a floor panel 26 for a second floor habitable room or rooms 24 mounted on cross beams 22 which are provided on posts 20 at their middle portions as shown in FIGS. 2 and 4, the posts 20 being supported on the ground sill 14, and a ceiling panel 30 mounted on cross beams 28 which are in turn provided on upper ends of the posts 20 and a roof board 32 such as roof batten provided over the ceiling panel 30.

The roof board 32 may be assembled through rafters not shown over the ceiling panel 30 and has fascia boards 34 provided at outer edges of eaves thereof so that the rafters are hidden thereby.

As shown in FIG. 1, an eaves backing board 36 may be provided between the fascia boards 34 and exterior walls 40 which will be described below so that the roof board 32 and the rafters are hidden. Not shown roof tiles or the like may be provided directly on the roof board 32, but may be provided through thin waterproofing membranes which are provided on the roof board 32.

As shown in FIG. 1, the building 10 comprises interior walls 38 and exterior walls 40 provided between the floor panels 18 and 26 defining the first floor habitable rooms 16 and between the floor panels 26 and the ceiling panels 30 defining the second floor habitable rooms 24. Thermally insulating panels 42 may be provided between the interior walls 38 and the exterior walls 40.

As shown in FIGS. 2 through 5, the thermally insulating panels 42 may be formed of substrate boards 46 secured between adjacent studs 44 and 44 and thereto, thermally insulating materials 48 such as glass wool boards or the like and asphalt roofing felt 50 of moisture transmission provided on the substrate boards 46.

As shown in FIG. 4, the interior wall 38 may comprise lath substrate boards 52 and interior finishing boards 54 provided on the lath substrate boards 52. In the illustrated embodiment the interior wall 38 surrounds and is secured to the posts 20 so that the latter are not exposed to the habitable rooms while the lath substrate boards 52 are faced to the thermally insulating panel 42. Thus, it will be noted that the illustrated building 10 is shown to have a so-called western style construction having a stud wall framing finished on both sides. The interior finishing boards 54 may be of suitable material such as cloth, gypsum wall board, flexible board or the like.

As shown in FIGS. 1 through 4, the exterior wall 40 may comprise wall material 41 in the form of panel which may be secured to the posts 20 so that it is faced with the thermally insulating panel 42. The wall material 41 may preferably have a cosmetic outer surface. The wall material 41 may be formed of suitable thermally insulating material such as wooden material, wooden compression member, non-asbestos, calcium silicate mortar, frame sawdust mortar, cement or the like.

As shown in FIGS. 1 through 5, the illustrated building 10 of the invention comprises two outer and inner air convection layers 56 and 58 provided in the panel-like wall material 41 in a manner individual from each other, an air confinement layer 60 provided between the air convection layers 56 and 58 in the panel-like wall material 41 and ventilation means 62 to ventilate the two air convection layers 56 and 58.

It should be noted that there may be provided in the wall material 41 more than two air convection layers and/or more than one air confinement layers. Such wall material will be described later with reference to FIGS. 10A through 10C.

Figure 3:
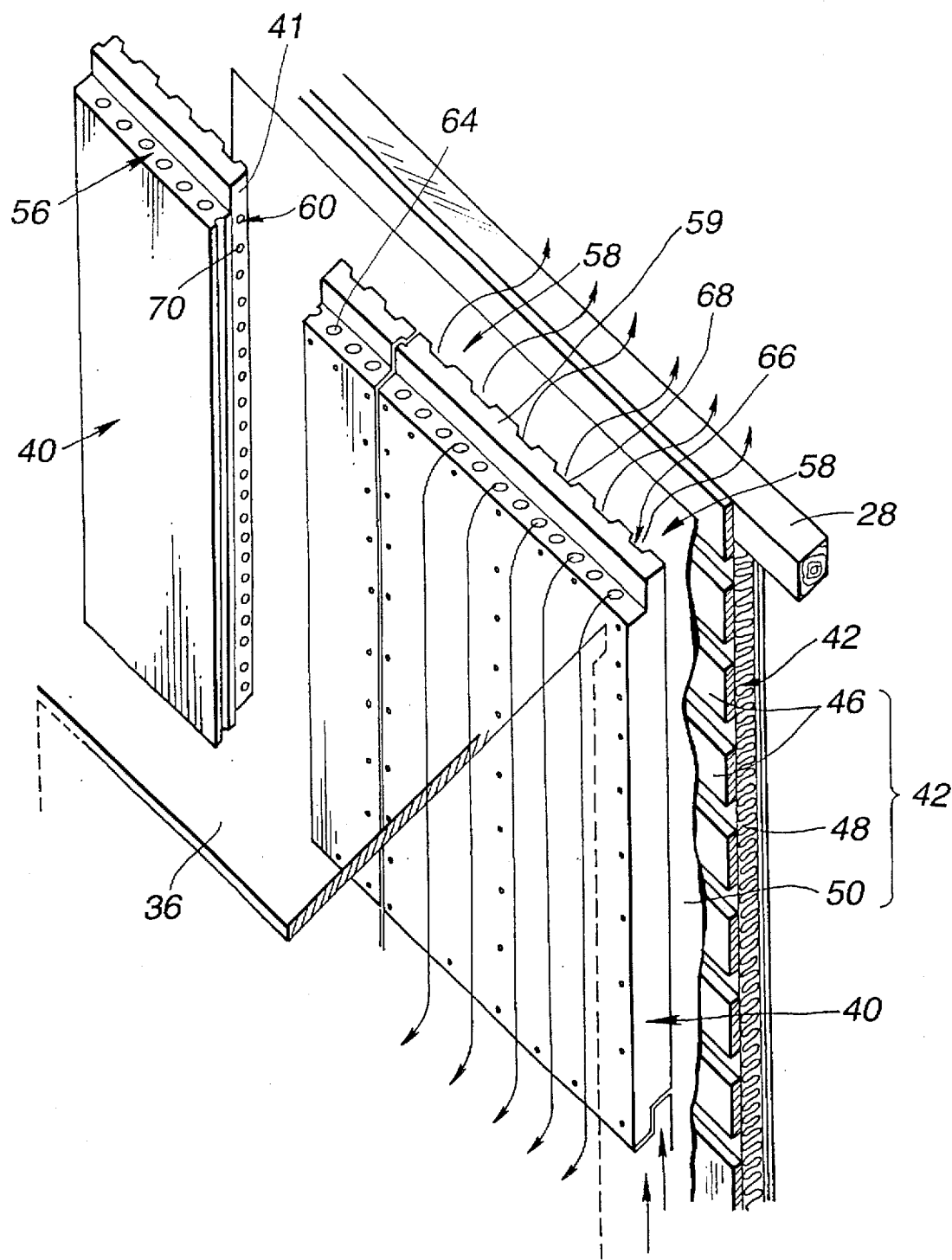
FIG. 3 is an enlarged perspective view of upper portions of an exterior wall and a thermally insulating panel used for the building of FIG. 1 and assembled with each other.

The exterior wall 40 is illustrated in more details in FIGS. 2 through 4. The outer air convection layer 56 of the double air convection layers 56 and 58 may be formed of plural air flowing ducts 64 in the form of longitudinal or vertical openings vertically provided in the wall material 41 of the exterior wall 40 on the outside thereof while the inner air convection layer 58 may be formed of longitudinal or vertical grooves 68 which are closed by the asphalt roofing felt 50 of the thermally insulating panel 42 so as to define a plural air flowing ducts 66.

Protrusions 59 between adjacent vertical grooves 68 have a function of longitudinal furring strips which serve to space the exterior wall 40 and the thermally insulating panel 42. Thus, it will be noted that the exterior wall 40 of such construction may enables the exterior wall 40 to be assembled without any furring strip prepared on the thermally insulating panel 42, which causes the building to be more economically built up.

As noted particularly from FIG. 2, the air confinement layer 60 may comprise plural air confined holes 70 provided between the outer and inner air convection layers 56 and 58 in the wall material 41 of the exterior wall 40. Since the air in the air confinement layer 60 is confined in the air confined holes 70, it never flows in a convective manner.

Figure 18:
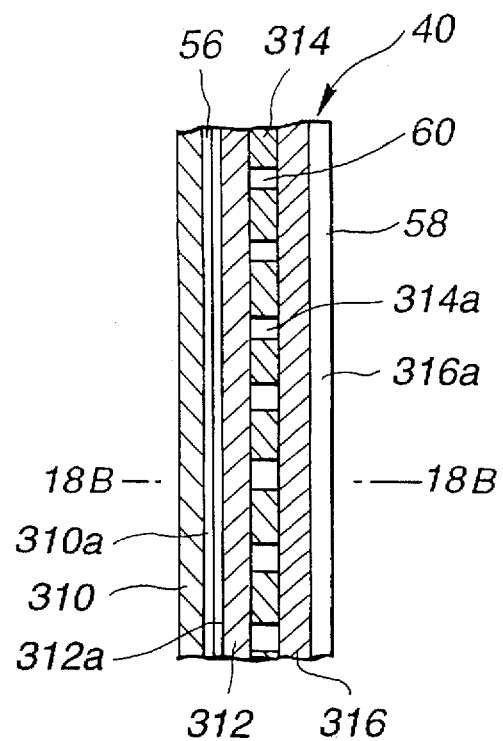
FIG. 18A is an enlarged sectional view of a building panel manufactured by means of one example of the invention.
FIG. 18B is a cross sectional view of the building panel of FIG. 18A taken along with a line 18B—18B thereof.
Figure 18:
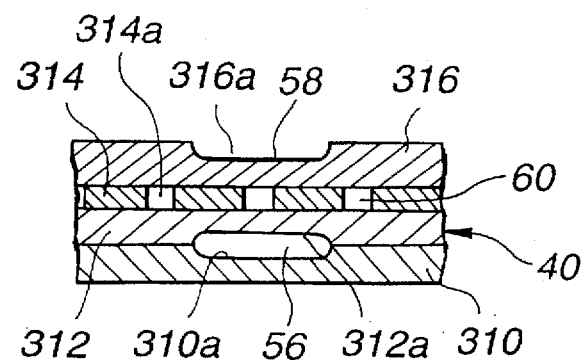

The exterior wall 40 of such a construction as shown in FIGS. 2 through 4 may be manufactured by four boards 310, 312, 314 and 316 adhered to each other by suitable adhesives in FIGS. 18A and 18B. The outer boards 310 and 312 have longitudinal or vertical grooves 310a and 312a provided therein and faced with each other so that they constitute the air flowing duct 64 of the air convection layers 56 when they are bound to each other. The board 314 has many holes 314a provided therein and closed by the adjacent boards 312 and 316 so that they constitute plural air confined holes 70 for the air confinement layer 60. The inner board 316 has longitudinal or vertical grooves 316a provided therein. The vertical grooves 316a constitute the air flowing duct 66 of the outer air convection layer 58 when the exterior wall 40 is assembled on the thermally insulating panel 42.

Figure 5:
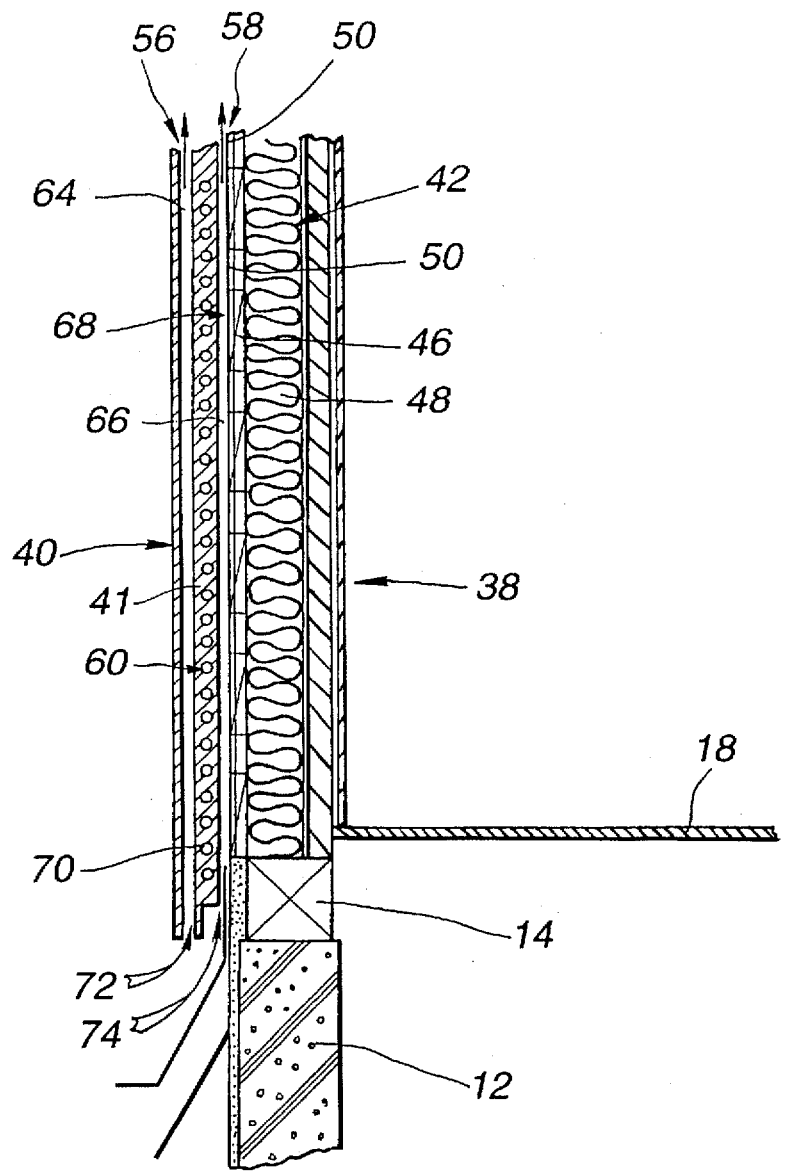
FIG. 5 is an enlarged vertically sectional view of an exterior wall, an interior wall and a thermally insulating panel used for the building of FIG. 1 and assembled with each other.

As shown in FIGS. 1 and 5, the ventilation means 62 may comprise air inlets 72 and 74 provided at a lower end of the wall material 41 of the exterior wall 40. Since the air inlets 72 and 74 are faced to ground with the lower ends of the air flowing ducts 64 and 66 opened toward the ground, air can flow through the air inlets 72 and 74 into the air convection layers 56 and 58.

The ventilation means 62 may further comprise an outer air outlet 76 provided at the upper end of the wall material 41 of the exterior wall 40 and through which the air in the outer air convection layer 56 flows out thereof and inner air outlets 78A and 78B through which air in the inner air convection layer 58 flows out thereof. As shown in FIG. 1, the inner air outlet 78A is provided at the eaves backing board 36 while the inner air outlet 78B is provided in a garret space 80. It should be understood that the air in the outer air convection layer 56 which tends to be affected by atmosphere temperature flows out thereof without being introduced into the garret space 80. This prevents the relatively hotter air in the outer air convection layer 56 from being mixed with the air in the inner air convection layer 58 within the garret space 80.

Figure 16:
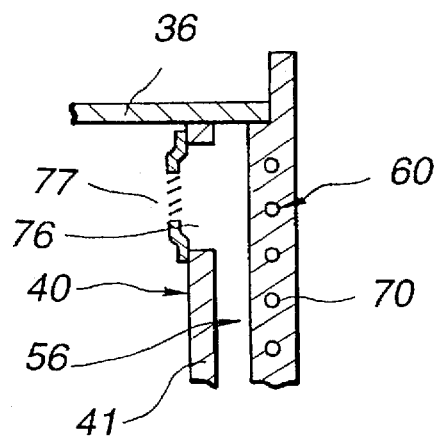
FIG. 16 is an enlarged sectional view of an upper portion of the exterior wall having a grid-like rain shutter member provided in the outer air outlet of the outer air convection layer.

As shown in FIG. 16, the outer air outlet 76 may be preferably provided with a grid-like rain shutter member 77 which serves to prevent rain water from intruding into the building, but allows the air to flow out of the building. If a fascia board 34 serves to effectively prevent rain water from intruding into the building, the grid-like rain shutter member 77 may be omitted.

As shown in FIG. 1, the ventilation means 62 may include louver fans 82 and 84 serving to forcedly discharge air out of the inside air outlets 78A and 78B and having louver boards provided so as to open and close air passages thereof. In the illustrated embodiment, the fan 82 may be provided at the eaves backing cover 36 having the inner air outlet 78A provided therein while the fan 84 may be provided at a ridge ventilating hood 33 of the roof board 32 having the inner air outlet 78B provided therein. As shown in FIG. 1, a canopy 86 may be provided at a portion of the exterior wall 40 between the first floor habitable room 16 and the second floor habitable room 24 that is at the position corresponding to the floor panel 26 for the second floor habitable room 24.

Figure 17:
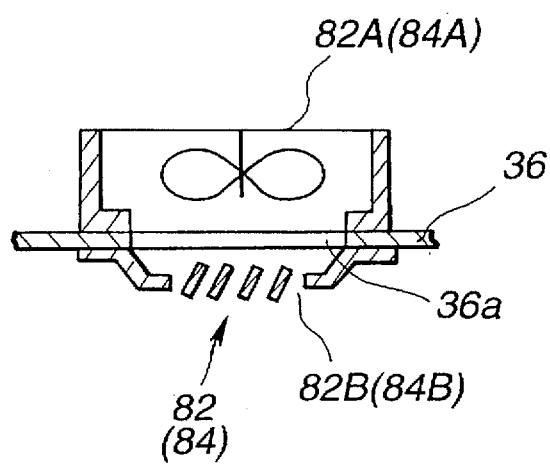
FIG. 17 is an enlarged sectional view or an eaves backing cover provided with a fan serving to forcedly discharge air out of the building through an inside air outlet and having louver boards provided so as to open and close an air passage thereof.

As shown in FIG. 17, the louver fan 82 may comprise a motor fan 82A provided on the eaves backing cover 36 inside thereof and disposed in a faced manner to an opening 36a in the eaves backing cover 36 and a closeable louver 82B provided on the eaves backing cover 36 outside thereof and disposed in a faced manner to the opening 36a in the eaves backing cover 36. The louver 82B serves to open the opening (the air outlet) in the eaves backing cover 36 or to close it. The motor fan 82A and the closeable louver 82B may be individually controlled as described later. Also, the louver fan 84 may comprise a motor fan 84A and a closeable louver 84B in the same manner as the louver fan 82.

In summer, the louver fans 82 and 84 may be so controlled as to be driven during the daytime through a photosensor not shown which generates a fan drive instruction when it receives sun light and stopped in the night time, for example. In winter, they may be so controlled as to be normally stopped.

The motor fans 82A and 84A may be driven by manual control in addition to the photosensor control or replaced thereby. The louvers 82B and 84B may be so controlled as to be opened in summer and closed in winter. They may be operated by manual control.

With two air convection layers 56 and 58 provided in the exterior wall 40 of the thermally insulated building 10, even though the air in the outer air convection layer 56 is heated by radiant heat on the exterior wall 40, the inner air convection layer 58 as air flowing therethrough which is never affected by the atmosphere temperature. Thus, it will be noted that the air in the inner air convection layer 58 serves to effectively isolate an room or rooms from the atmosphere temperature.

In summer, the outer air convection layer 56 serves to absorb radiant heat on the outer surfaces of the exterior wall 40 and discharge it through natural air convection or natural ventilation. Thus, the outer air convection layer 56 serves to cool the exterior wall 40 and also improve heat interruption of the inner air convection layer 58. This substantially improves the thermal insulation of the exterior wall 40.

In winters the air in the outer air convection layer 56 absorbs cold through the outer surface of the exterior wall 40, which is cooled thereby, but the cooled air is lowered along the air convection layer 56 in a reverse direction and discharged out thereof it will be noted that this improves the thermal insulation of the inner air convection layer 58.

The air confinement layer 60 provided between the adjacent air convection layers 56 and 58 serving to confine air therein has a function of insulating heat by interruption of heat between the outer and inner air convection layers 56 and 58 and to prevent the convective air in the inner air convection layer 58 from being affected by the air in the outer air convection layer 56 which is in turn affected by the atmosphere temperature through the outer surface of the exterior wall 40. Thus, it will be noted that the air confinement layer 60 may more effectively improve thermal insulation of the exterior wall 40.

As aforementioned, the ventilation means 62 serves to make the air in the outer air convection Layer 56 flow out through the outer air outlet 76 at the upper end of the exterior wall 40 directly outside the building 10. This prevents the air in the outer air convection layer 56 from being introduced into the garret space 80. Since only the air in the inner air convection layer 58 is introduced into the garret space 80, it is never affected by the atmosphere temperature because the air in the inner air convection layer 58 is never mixed with the air in the outer air convection layer 56. This restrains the room or rooms adjacent to the garret space 80 from being affected by the atmosphere temperature and as a result the room or rooms may be preferably of comfortable habitable space.

As aforementioned, in summer, the motor fans 82A and 84A may be driven so as to forcibly discharge the air in the inner air convection layer 58 out thereof, if necessary, and in winter, they may be stopped while the louvers 82B and 84B may be closed so as to close the air outlet 78 to stop ventilation. Thus, in winter, the inner air convection layer 58 may hold air therein so as to interrupt heat and cool from being transferred from one of the outside and the inside of the building 10 to another. This causes the interior space of building to be thermally insulated.

In winter, the louvers 82B and 84B may be kept opened while the motor fans 82A and 84A may be stopped. The ventilation means 62 may comprise only closeable louvers without any motor fan. In this case, the closeable louvers may be adapted to be closed or opened by motors.

A temperature in the garret space 80 will be raised to more than 40° C. during the daytime in summer, which will be caused by heat ascent due to convective air in the inner air convection layer 58 and radiant heat on the roof and which is substantially higher than the atmosphere temperature. The heated air in the garret space 80 will be swept out by the air flowing in the garret space 80 by the operation of the motor fans 82A and 84A in the inner air outlets 78A and 78B of the ventilation means 62. Since the air flowing up through the inner air convection layer 58 is relatively cool because the inner air convection layer 58 is not subject to radiant heat, it is forcibly discharged through the inner air outlet 78B in the ridge ventilating hood 33 of the roof while accompanying heat in the garret space 80. Thus, it will be noted that radiant heat is prevented from being confined to the building.

In summer, since cool air flows in the air convection layers 56 and 58 due to natural air convection at night although the motor fans 82A and 84A are not driven, the exterior wall 40 serves to collect and store cool therein. As the temperature in the room or rooms of the building 10 rise during the daytime this collected and stored cool is discharged within the room or rooms so that the room temperature is prevented from rising.

Humidity which tends to be condensed on the interior wall 38 due to operation of a cooling and/or heating equipment is introduced through the thermally insulating panel 42 of moisture transmission into the inner air convection layer 58, carried by air flowing up therethrough and then discharged out of the building 10. Thus, building material is effectively prevented from being rotten due to moisture.

As aforementioned, in winter, the motor fans 82A and 84A are stopped while the louvers 82B and 84B are closed. This causes air in the outer and inner air convection layers 56 and 58 to be kept contained therein. As a result, the outer and inner air convection layers 56 and 58 serve to insulate heat between the exterior and the interior of the building 10. This prevents heat within the room or rooms from being discharged out of the building, which causes heating costs to be economically saved. This also prevents dew from being condensed on the wall material and then prevents the latter from being deteriorated.

Figure 6:
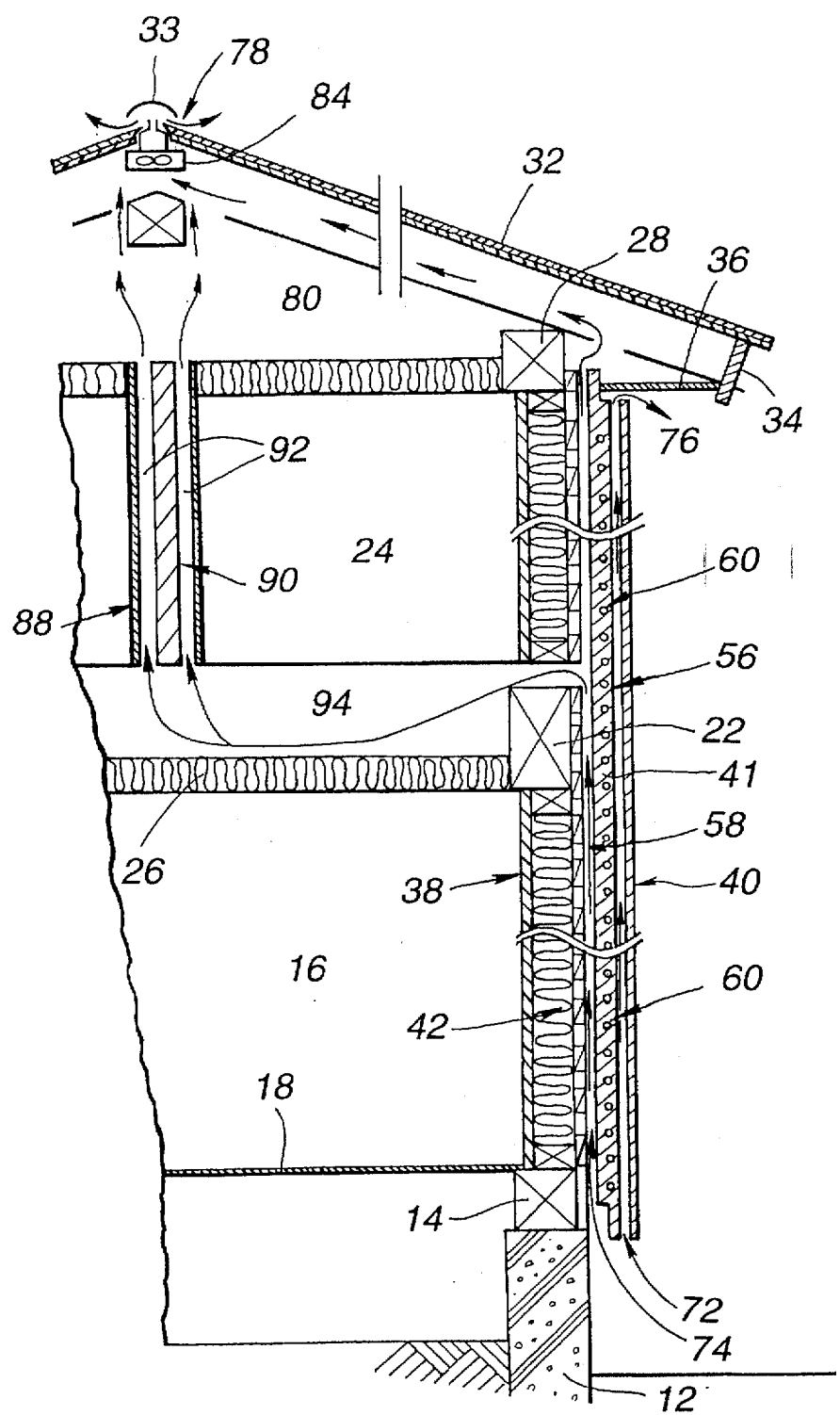
FIG. 6 is a schematically sectional view of a thermally insulated building constructed in accordance with another embodiment of the invention.
Figure 7:
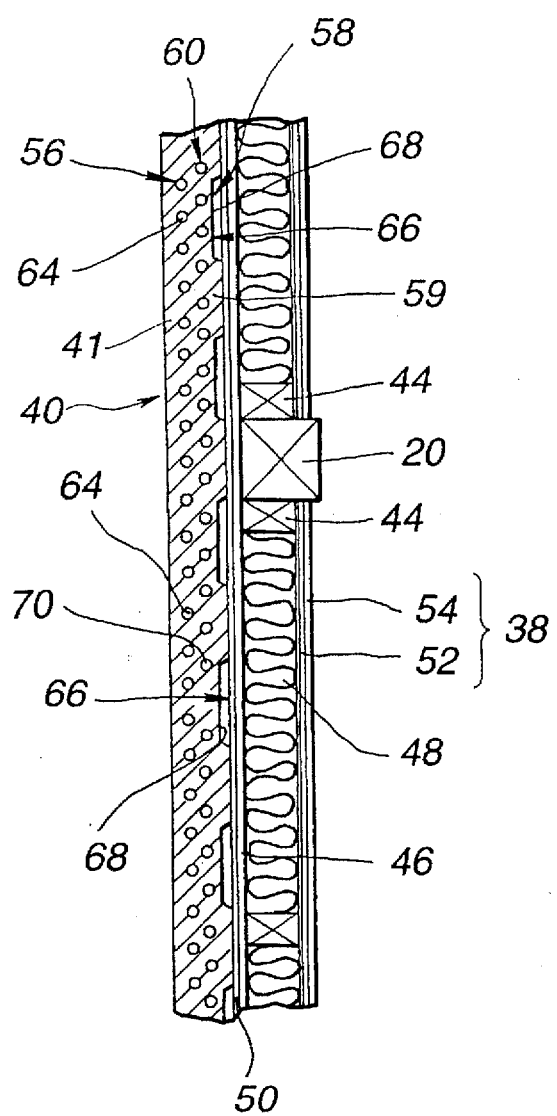
FIG. 7 is an enlarged coss-sectional view of an exterior wall, an interior wall and a thermally insulating panel used for the building of FIG. 6 and assembled with each other.
Figure 8:
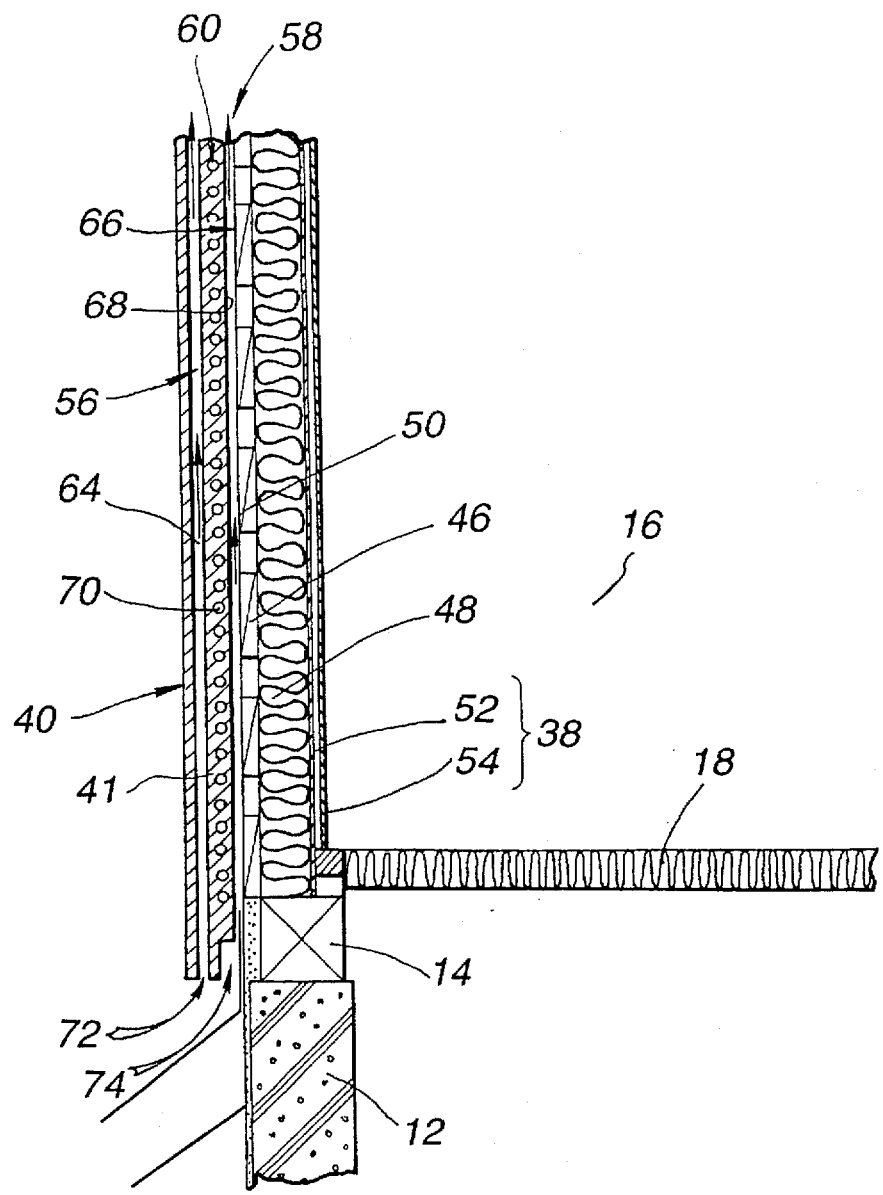
FIG. 8 is an enlarged and vertically sectional view of an exterior wall, an interior wall and a thermally insulating panel used for the building of FIG. 6 and assembled with each other.

Referring now to FIG. 6 there is shown a building constructed in accordance with a modification of the invention. The modified building 10 may have air introduction means 90 which serves to introduce a portion of air in the inner air convection layer 58 through a ceiling space 94 over the ceiling between the first floor and second floor habitable rooms and then through a partition wall 88 provided between the adjacent second floor rooms 24. The modified building 10 is shown to have a so-called Japanese style construction in which the posts 20 are exposed to the habitable rooms 16 and 24. The modified building 10 is substantially identical to that constructed in accordance with the embodiment of FIGS. 1 through 4.

The air introduction means 90 may comprise plural air flowing ducts 92 which extend through the partition wall 88 provided between the adjacent second floor rooms 24. Lower end openings of the air flowing ducts 92 communicate with the ceiling space 94 over the first floor habitable room 16 while upper end openings of the air flowing ducts 92 communicate with the garret space 80.

In the modified building 10, a portion of the air in the inner air convection layers 58 is introduced into the ceiling space 94, passes through the air flowing ducts 90 in the partition wall 88 between the second floor rooms 24 and enters the garret space 80. The divided air through the air flowing ducts 90 flows together with the main air flowing up through the whole inner air convection layer 58 into the garret space 80. Thus, this building has an advantage of effectively isolating the exterior wall 40 from the atmosphere temperature and another advantage of breaking heat exchange between the first floor and second floor rooms and between the adjacent second floor partitioned rooms 24.

Figure 9A:
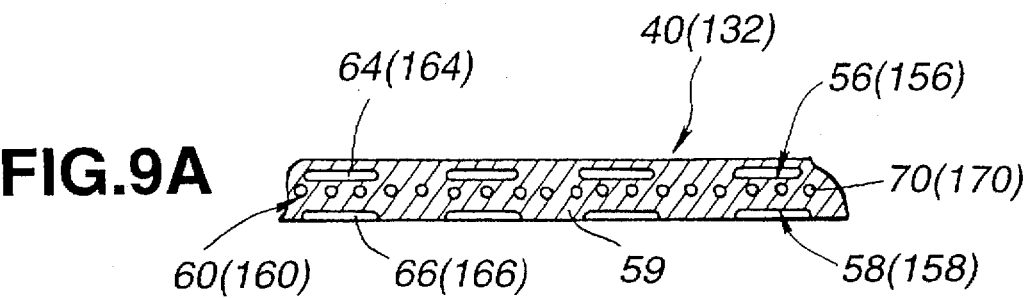
FIGS. 9A through 9C illustrate in cross sectional views three building panels of different types for an exterior wall or a roof board constructed in accordance with the invention, respectively.
Figure 9B:
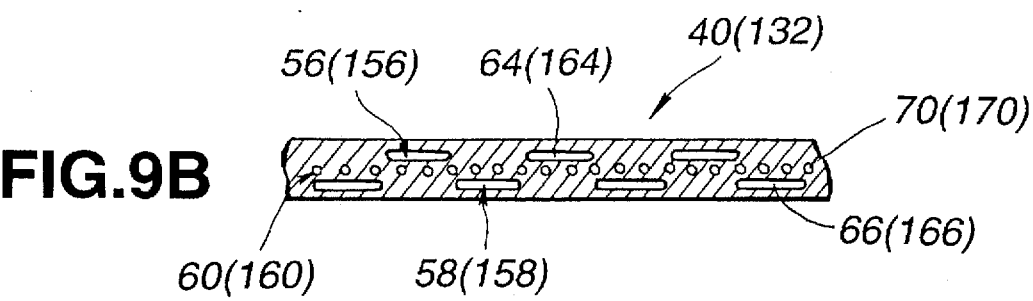

Although, in the illustrated embodiments, the outer air convection layers 56 comprises air flowing ducts 64 of longitudinal or vertical holes provided in the exterior wall 40, they may be slot-like as shown in FIGS. 9(A) or FIG. 9(B).

Figure 9C:
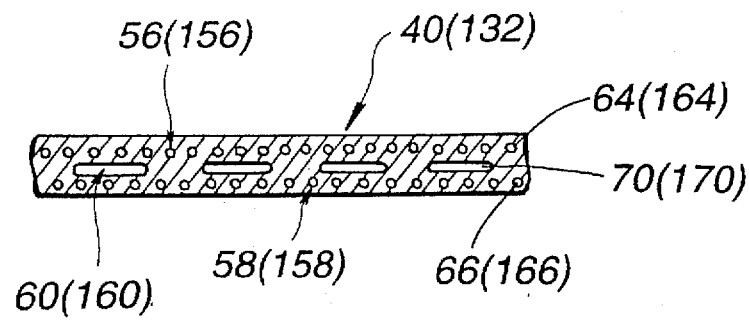

Although, in the illustrated embodiments, the inner air convection layers 58 comprises air flowing ducts 66 of longitudinal or vertical grooves, they may be of slot-like or longitudinal hole-like as shown In FIG. 9(6) or FIG. 9(C).

Although, in the illustrated embodiment, the air confinement layer 60 comprises a plurality of ball-like air confined holes 70, they may be of plural slender holes as shown in FIG. 9(C).

Figure 10A:
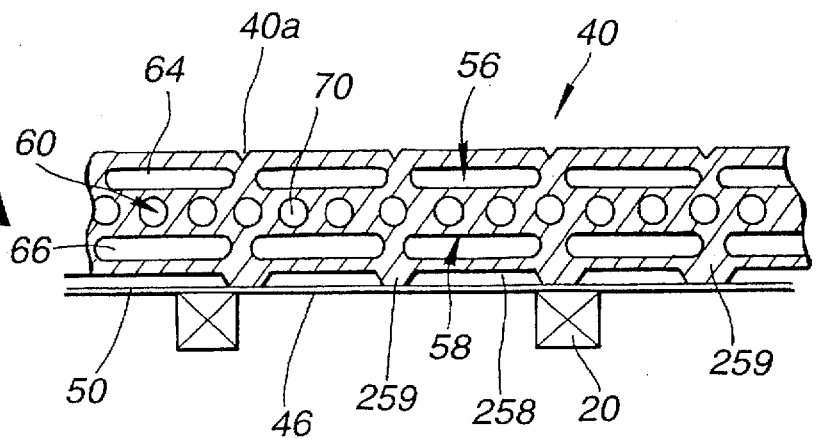
FIGS. 10A through 10C illustrate in cross sectional views further three building panels of different types for an exterior wall or a roof board constructed in accordance with the invention.
Figure 10B:
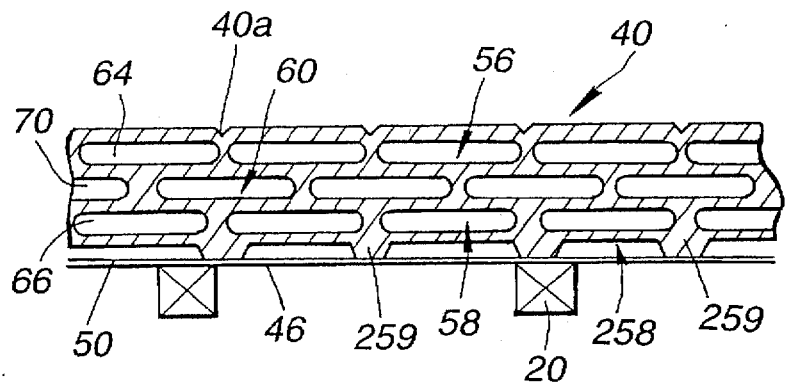
Figure 10C:
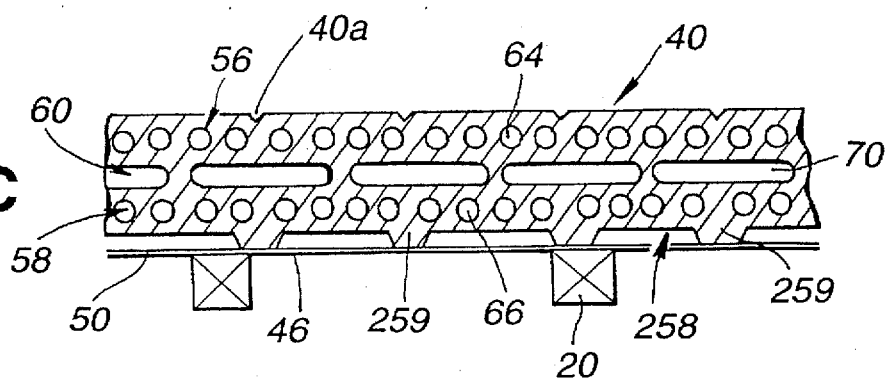

Exterior walls (panels) of the invention are shown in FIGS. 10(A) through 100(C), respectively. The exterior walls 40 of these figures are substantially identical to that of FIGS. 1 through 9, except that they comprise three air convection layers and only one air confinement layer provided between two air convection layers 56 and 58. The air convection layers and the air confinement layer may be modified in various forms. As shown in FIG. 10A–10C, an additional air convection layer 258 is provided inside of the inner air convection layer 58 with protrusions 259 formed between the adjacent vertical grooves 258 and serving as referring strips. The wall material of the exterior wall 40 may have a portion with which is engaged a head of a nail driven into the exterior wall 40 to secure the latter to the substrate board 46 of the thermally insulating panel 42. In the exterior wall 40 of FIGS. 10A through 10C, the outermost air convection layer 56 communicates directly with the atmosphere through the outer air outlet in the same manner as shown in FIG. 1.

In the building 10 of the embodiment and the modification, the ventilation means 62 may comprise the outer air inlet 72 and the outer air outlet 76 for the outer air convection layer 56 so as to have no forced ventilation function, but there may be a louver fan provided in the outer air outlet 76, although not shown.

Although In the illustrated embodiment, the louver fan 84 for the ventilation means 62 is shown to be provided in the ridge ventilating hood 33 because the building 10 being of hip roof type, it may be provided in the exterior wall 40 on its side position where it corresponds to the garret space 80 if the building 10 is of gable roof type. Also, the louver fans may be replaced by louvers.

Figure 11:
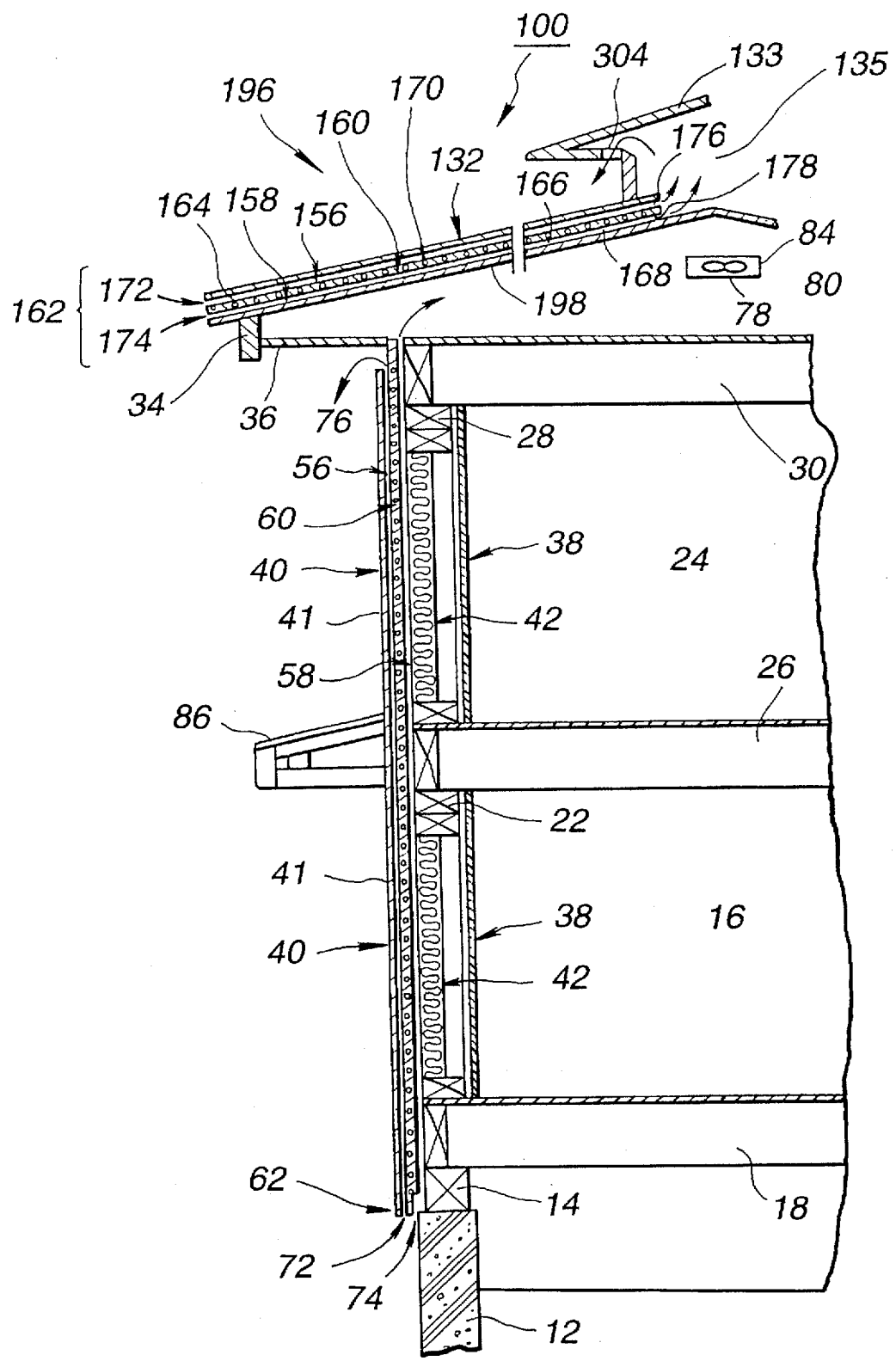
FIG. 11 is a schematically sectional view of a thermally insulated building having a roof board also constructed in accordance with the invention.
Figure 12:
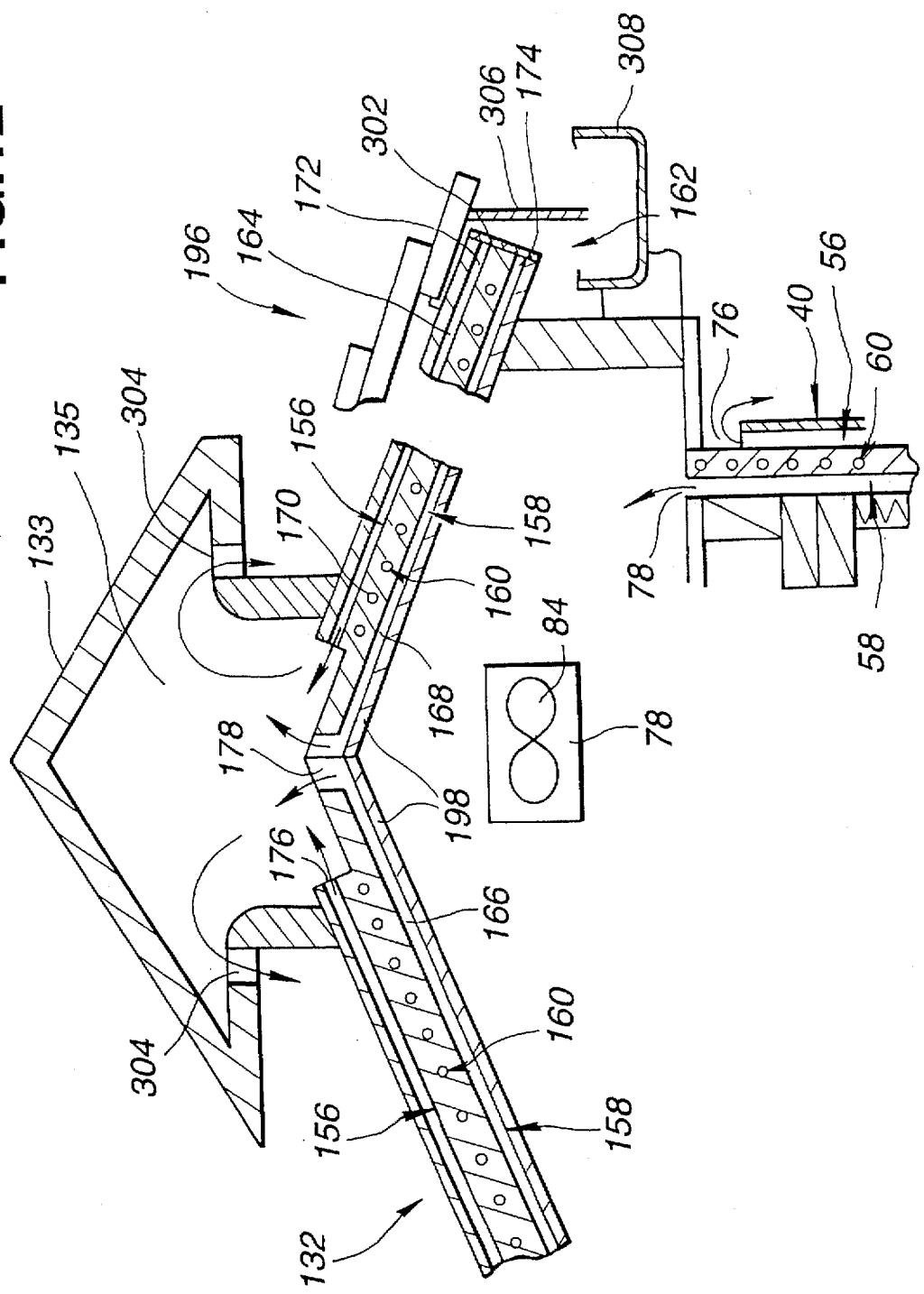
FIG. 12 is an enlarged sectional view of the roof used in the building of FIG. 11 in more details.

A thermally insulated building 100 in which a principle of the invention is applied also to a roof is shown in FIGS. 11 and 12. The thermally insulated building 100 may comprise a roof 196 having two air convection layers 156 and 158 and one air confinement layer 160 provided in a roof board 132 as well as the exterior wall 40 having the two air convection layers 56 and 58 and one air confinement layer 60 provided in the wall material 41.

As shown in more detail in FIG. 12, the outer air convection layer 156 may comprise an air flowing duct 164 extending through the roof board 132 along an inclination thereof while the inner air convection layer 158 may comprise longitudinal grooves 168 extending along the inclination of the roof board 132 and defined by an inner roof board 198 provided inside of the roof board 132 to form air flowing duct 166 therebetween.

The air confinement layer 160 may comprise plural air confinement holes 170 provided in the roof board 132 between the air convection layers 156 and 158.

The exterior wall 40 has a construction substantially identical to that of the building of FIGS. 1 through 8, except that one air outlet 78 for the inner air convection layer 58 is provided in the exterior wall 40 on its side because of the building being of gable roof type and the louver fan 82 may be provided in the air outlet 78.

As shown in FIG. 12, roof board ventilation means 162 may comprise outer and inner air inlets 172 and 174 provided at lower ends of the air convection layers 156 and 158 and closed by a net 302 at a lower edge of the roof board 132, outer and inner air outlets 176 and 178 provided at upper ends of the air convection layers 156 and 158 so as to communicate with a space 135 within the ridge ventilating hood 133 and air exhaust openings 304 in a horizontal flange portion of the ridge ventilating hood 133 so as to prevent rain water from flowing into the space 135.

The roof board ventilation means 162 may also comprise a throating member 306 suspended through a supporting member not shown from a lower edge of the roof board 132 so as to cover the net 302. The throating member 306 serves to prevent rain water from flowing into the air inlets 172 and 174. A rain water gutter 308 may be provided on the fascia board so as to receive rain water from lower edges of roof tiles. Although not shown, the roof board ventilation means 162 may comprise a louver fan provided in the ridge ventilating hood 133. The louver fan may be controlled by a photosensor and/or manually driven in the same manner as the louver fan for the exterior wall ventilation means 62.

In the embodiment of FIGS. 11 and 12, the air outlets 176 and 178 for the outer and inner air convection layers 156 and 158 communicate with the space 135 within the ridge ventilating hood 133 so that the air from the outer and inner air convection layers 156 and 158 are mixed with each other within the ridge ventilating hood 133.

Since the mixed air is far away on the second floor habitable room 304 through the garret space 80 and discharged out of the space 135 within the ridge ventilating hood 133 through The air exhaust opening 304, the mixed air in the space 135 is negligibly affected by the air in the outer air convection layer 156 which tends to be most adversely affected by the outside air temperature. As a result, the second floor habitable room 24 is not affected by the mixed air in the space 135.

Figure 13:
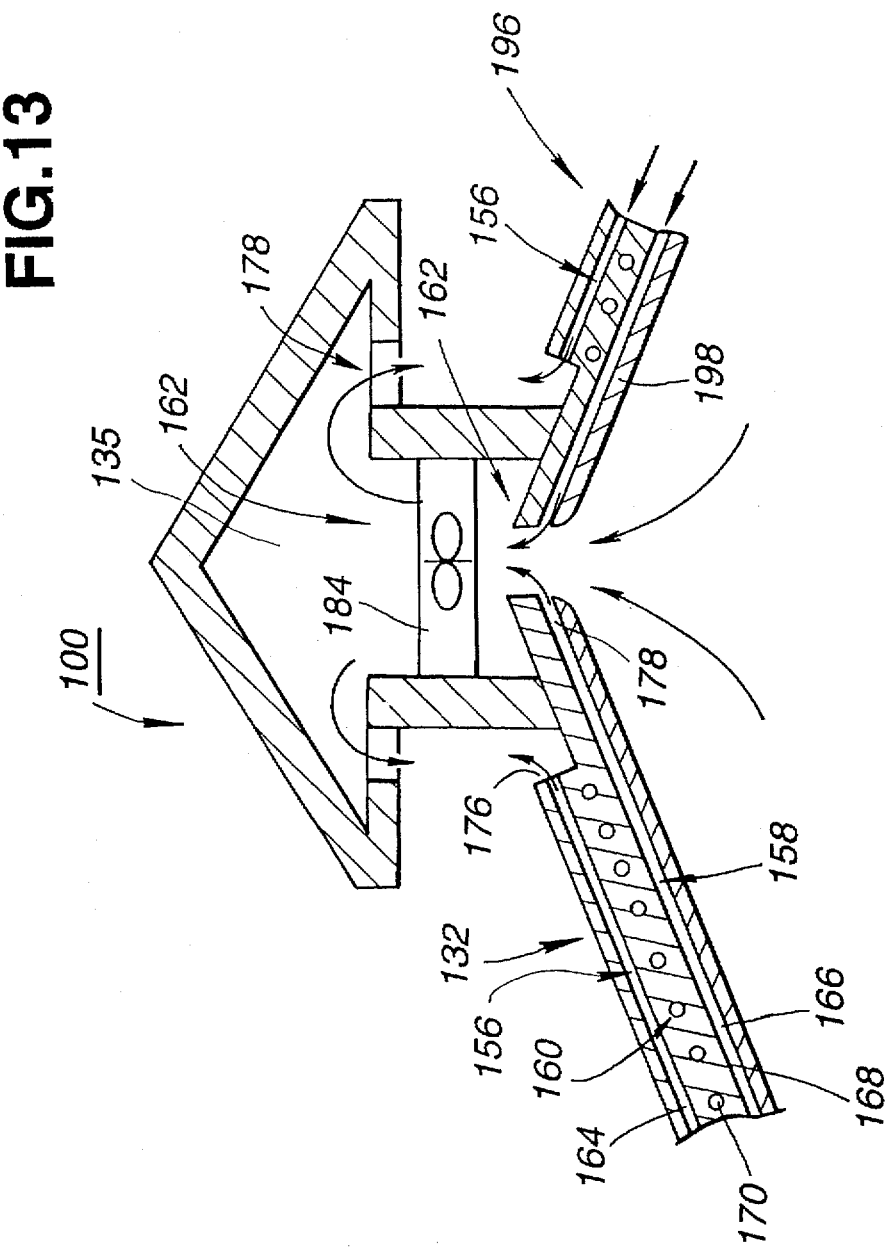
FIG. 13 is an enlarged sectional view of the roof of FIG. 12 modified.

A further modified building is shown in FIG. 13. In the modified building, the air outlet 176 for the outer air convection layer 156 is opened directly to the outdoor without communicating with space 135 within the ridge ventilating hood 133. The garret space 80 may communicate with the space 135 within the ridge ventilating hood 133 as well as the air outlet 178 for the inner air convection layer 158 in the roof board 132. Therefore, the air from the air convection layer 158 for the roof board is mixed with the air from the convection layer 58 for the exterior wall 40 in the space 135 within the ridge ventilating hood 133. The air outlet 176 may be preferably covered with a rain water shutter not shown so as to prevent rain water from flowing into the air outlet 176.

The ventilation means 162 may further comprise a louver fan 184 provided in the space 135 within the ridge ventilating hood 133 and adapted to be controlled by a photosensor and/or manually driven. The louver fan 184 serves to discharge the air from the inner air convection layer 158 for the roof as well as the air from the inner air convection layer 58 for the exterior wall 40. Of course, the louver fan 184 may be replaced by a louver. The louver fan 184 may be of such a type as illustrated in FIG. 17.

As shown in FIG. 13, with air convection layers 156 and 158 and the air confinement layer 160 provided in the roof board 132 so as to provide thermal insulation thereto, the outer air convection layer 156 is discharged out of the roof board 132 while absorbing radiant heat therefrom while fresh air Is always introduced into the inner air convection layer 158 by the operation of the louver fan 184. This causes the roof board to be more effectively thermally insulated therebetween. The roof tiles may be laid on the roof board 132 directly or with waterproofing membrane provided therebetween.

Although, in the illustrated embodiments, two air convection layers 56 and 58 or 156 and 158 are combined with one air confinement layer 60 or 160 provided therebetween, more than two air convection layers and one or more than one air confinement layer may be provided in combination in the same manner as shown in FIGS. 10A though 10C.

Although, in the illustrated embodiment, the fans for the ventilation means 62 and 162 may be provided only for the inner air outlets, they may be also provided for the outer air outlets. The air convection Layers 56, 58, 156 and 158 and of the air confinement layers 60 and 160 may be not in the form of hole, but in the form of slot.

Figure 14:
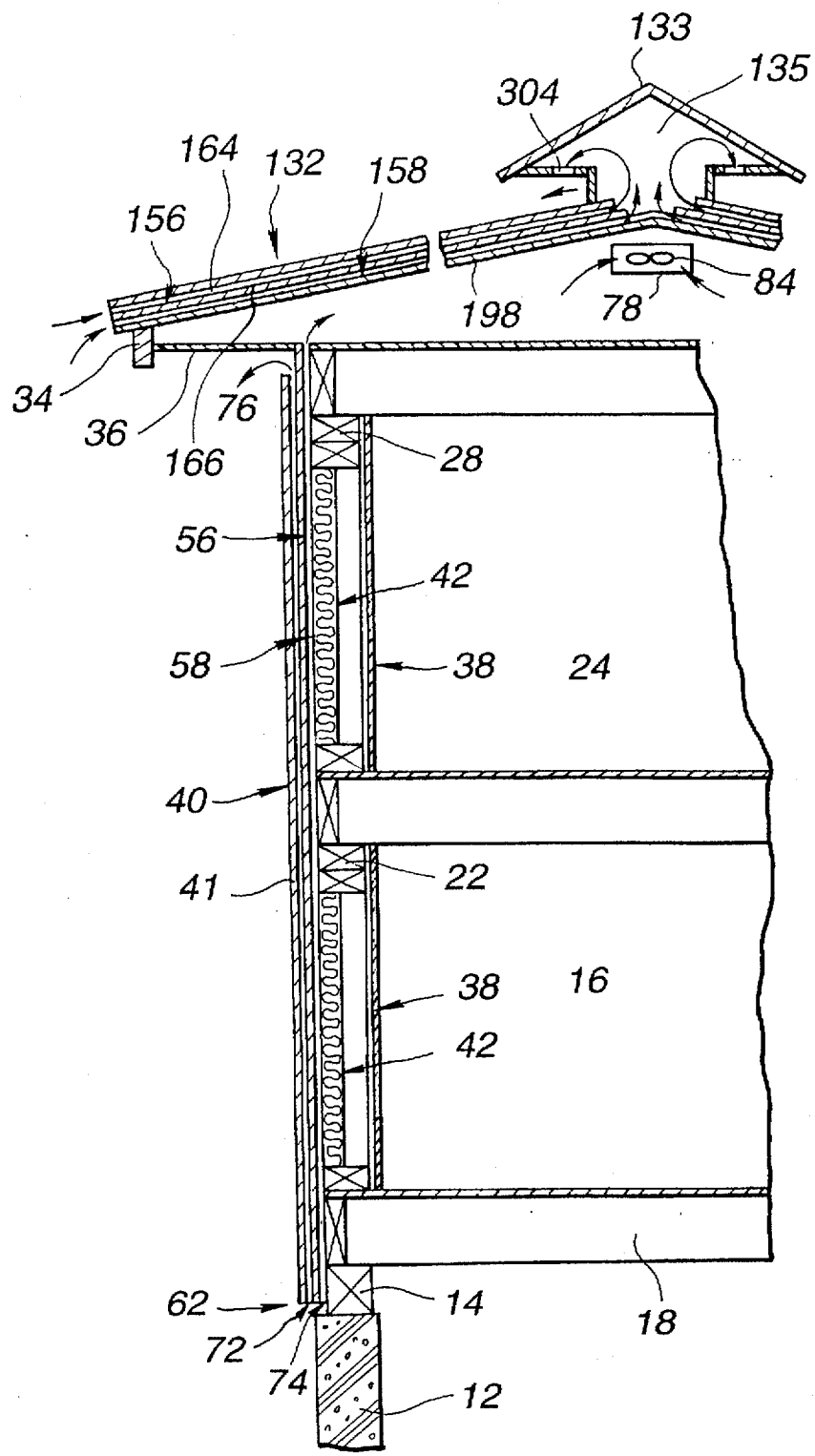
FIG. 14 is similar to FIG. 11, but a schematically sectional view of the thermally insulated building further modified.
Figure 15:
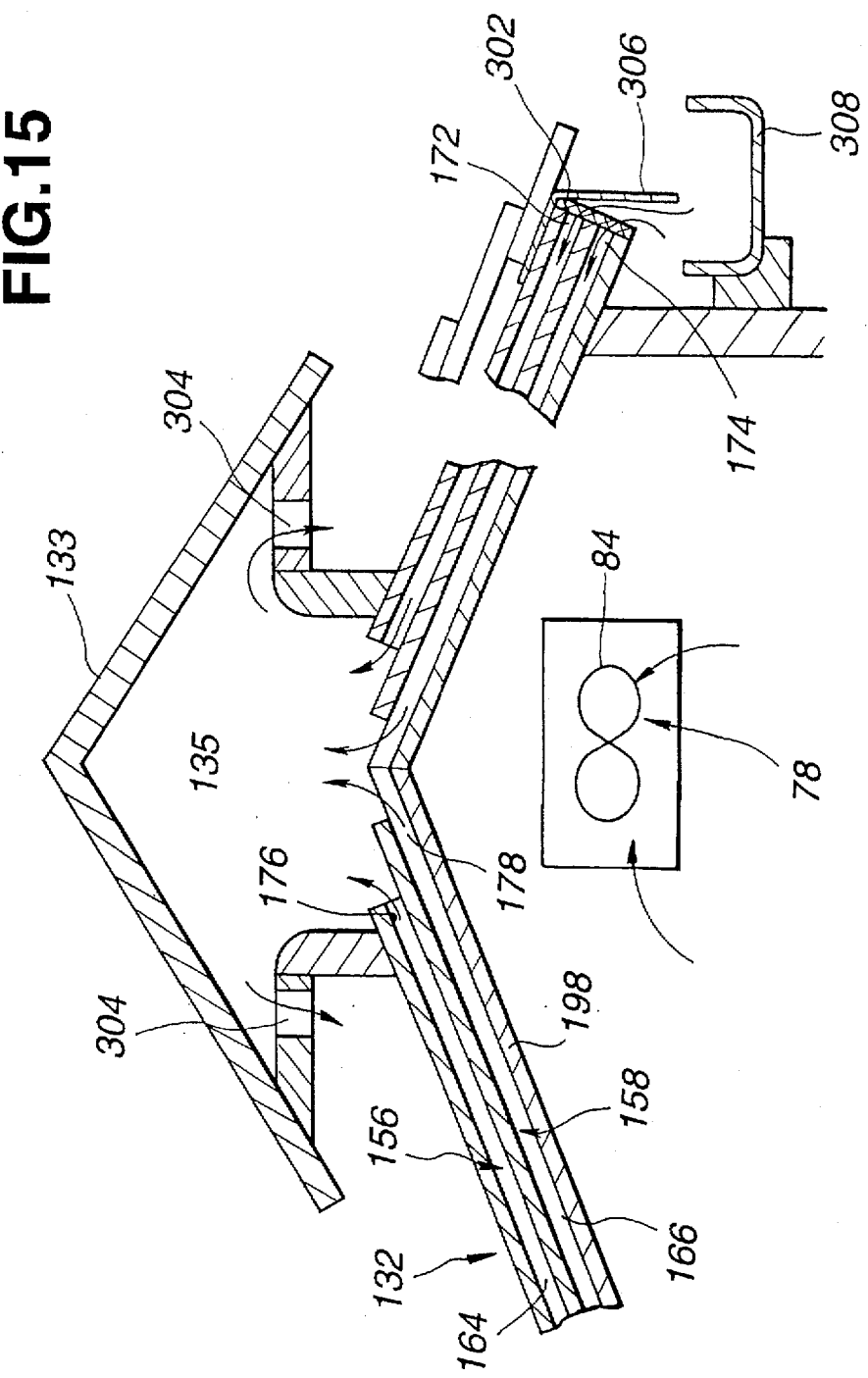
FIG. 15 is an enlarged sectional view of the roof used in the building of FIG. 14 in more details.

A farther modified building of the invention is shown in FIGS. 14 and 15 in the building of these figures, the exterior wall 40 may comprise two air convection layers 56 and 158 without any air confinement layer provided therebetween and also the roof board 132 may comprise two air convection layers 156 and 158 without any air confinement layer provided therebetween.

Although, in the modification of FIGS. 14 and 15, both of the air outlets 176 and 178 for the outer and inner air convection layers 156 and 158 in the roof board 132 communicate with the space 135 within the ridge ventilating hood 133, the air outlet 176 may be opened directly to the outdoor in the same manner as shown in FIG. 13.

In the modification of FIGS. 14 and 15 since there is provided no air confinement layer between the air convection layers 56 and 58 or 156 and 158, thermal insulation between the air convection layers 56 and 58 or 156 and 158 is more poorly made than the embodiments of FIGS. 1 through 13. Nevertheless, the air in the outer air convection layers 56 and 156 which tends to be adversely affected by the atmosphere temperature is discharged out of the exterior wall 40 or the roof board it 132 due to natural or forced air convection so as to improve thermal insulation of the inner air convection layers 58 and 158. Furthermore, since the air in the outer air convection layer 56 for the exterior wall 40, which tends to be affected by the atmosphere temperature, are never mixed with the air in the inner air convection layer 58 for the exterior wall 40 within the garret space 80, which enables thermal insulation of the exterior wall 40 to be positively kept.

In the modification of FIG. 14 and 15, there may be provided more than two air convection layers and a louver fan may be commonly used for the exterior wall 40 and the roof board 132 in the same manner as shown in FIG. 13.

It will be understood that the invention may be applied to wood buildings of various construction including wood frame or two by four construction, prefabricated buildings and steel frame buildings.

It should be noted that since the exterior wall and/or the roof board having the air convection layers and the air confinement layer or layers provided therein are integrally formed in the form of panel, the building can be more easily assembled.

Although some embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A building comprising a garret space over an uppermost room, an exterior wall having a plurality of air convection layers provided in said exterior wall separated individually from each other and each comprising passageways for convective air flow therethrough, the air convection layers having an outermost air convection layer and at least one inner air convection layer, and ventilation means to ventilate said plurality of air convection layers, said ventilation means including air inlets provided at a lower end of said exterior wall for ambient air flow into said air convection layers, an outer air outlet provided at an upper end of said exterior wall communicating with the outermost air convection layer so that the air flow in said outermost air convection layer flows out thereof to the atmosphere, and an inner air outlet communicating through said garret space with the inner air convection layer so that air in said inner air convection layer flows out thereof and into said garret space for return to exit to the atmosphere.

2. The building according to claim 1, further comprising an air confinement layer provided in said exterior wall between the air convection layers.

3. The building according to either claim 1 or 2, further comprising a louver fan serving to forcibly discharge air through said inner air outlet and having louver boards provided so as to open and close said inner air outlet.

4. The building according to claim 1, further comprising a roof board having a plurality of air convection layers provided in said roof board separated individually from each other and each comprising passageways for convective air flow therethrough, the roof board air convection layers having an outermost roof air convection layer and at least one inner roof convection layer and roof ventilation means to ventilate said roof board air convection layers, said ventilation means including an air inlet provided at a lower end of said roof board for ambient air flow into said roof board air convection layers, an outer air outlet provided at an upper end of said roof board communicating with the outermost roof air convection layer so that the air flow in said outermost air convection layer flows out thereof to the atmosphere, and an inner air outlet provided in a ridge ventilating hood communicating through a space within said ridge ventilating hood with the roof inner air convection layer so that the air in the roof inner air convection layer flows out thereof.

5. The building according to claim 4, further comprising a roof air confinement layer provided in said roof board between the air convection layers.

6. The building according to either claim 4 or 5, further comprising a louver fan serving to forcibly discharge air through said inner air outlet in said ridge ventilating hood and having louver boards provided so as to open and close said inner air outlet.

7. The building according to claim 1, wherein the air convection layers include an innermost air convection layer and the innermost air convection layer includes longitudinal grooves in said exterior wall with protrusions between adjacent longitudinal grooves serving as furring strips.

8. The building according to claim 1, wherein said exterior wall has a longitudinal dimension and the inner one of said air convection layers is formed of air flowing ducts in the form of longitudinally directed openings extending through said exterior wall.

9. A building comprising a roof board having a plurality of air convection layers provided in said roof board separated individually from each other and each comprising passageways for convective air flow therethrough, the air convection layers having an outer air convection layer and at least one inner air convection layer, and ventilation means to ventilate said air convection layers, said ventilation means includes air inlets provided at a lower end of said roof board and through which air flows into said air convection layers, and outer and inner air outlets provided in a ridge ventilating hood communicating through a space within said ridge ventilating hood with said outer and inner air convection layers so that the air flows out thereof.

10. A building panel comprising a body panel having a plurality of ventilated air convection layers provided therein and an unventilated air confinement layer provided between the air convection layers wherein the air convection layers have an innermost air convection layer and that the innermost air convection layer of said air convection layers comprises longitudinal grooves with protrusions between adjacent longitudinal grooves serving as furring strips.

11. A building comprising a panel having a plurality of air space layers, said layers comprising channels in said panel, said channels being separated from each other, ventilation means to ventilate at least one of said air space layers, and an unventilated air confinement layer provided between said channels.

12. A building comprising a garret space over an uppermost room, an exterior wall having a plurality of air convection layers provided in said exterior wall separated individually from each other and each comprising passageways for convective air flow therethrough, the air convection layers having an outermost air convection layer and at least one inner air convection layer, ventilation means to ventilate said plurality of air convection layers, said ventilation means including air inlets provided at a lower end of said exterior wall for ambient air flow into said air convection layers, an outer air outlet provided at an upper end of said exterior wall communicating with the outermost air convection layer so that the air flow in said outermost air convection layer flows out thereof to the atmosphere, and an inner air outlet communicating through said garret space with the inner air convection layer so that air in said inner air convection layer flows out thereof and into said garret space for return to exit to the atmosphere, an air confinement layer provided in said exterior wall between the air convection layers and the air flow in each of the air convection layers is adapted to have a convection flow in the same direction.

* * * * *

UNITED STATES PATENT AND TRADEMARK OFFICE
CERTIFICATE OF CORRECTION

PATENT NO. : 5,761,864
DATED : June 9, 1998
INVENTOR(S) : Tadamichi Nonoshita

It is certified that error appears in the above-indentified patent and that said Letters Patent is hereby corrected as shown below:

On the title page, item [56] References Cited, insert the following:

```
--4,254,598   3/1981    Rugroden..........52/95X
  3,049,067   8/1962    Claude............454/186
  2,601,905   7/1952    Anderegg..........454/185X
  1,654,631   1/1928    Bevier............52/302.4X
  1,539,611   5/1925    Trowbridge........52/302.4X
  1,410,588   3/1922    Myers.............52/302.4X
  1,257,819   2/1918    Doern.............52/302.4
  5,561,958  10/1996    Clement et al.....52/302.3X
  1,168,304   1/1916    Hellstrom.........454/185X
    236,111  12/1880    Tiffany...........454/185X
    445,486   1/1891    Andrews...........454/185--
```

UNITED STATES PATENT AND TRADEMARK OFFICE
CERTIFICATE OF CORRECTION

PATENT NO.  : 5,761,864
DATED       : June 9, 1998
INVENTOR(S) : Tadamichi Nonoshita It is certified that error appears in the above-indentified patent and that said Letters Patent is hereby corrected as shown below:

Column 2, line 38, delete "wail" and insert --wall--.

Column 2, line 51, delete "Lower" and insert --lower--.

Column 2, line 56, delete "convention" and insert --convection--.

Column 4, line 27, delete "strides" and insert --strips--.

Column 5, line 21, delete "or" and insert --of--.

Column 5, line 67, delete "wails" and insert --walls--.

Column 6, line 10, insert a comma --,-- after "embodiment".

Column 6, line 30, delete "53" and insert --58--.

UNITED STATES PATENT AND TRADEMARK OFFICE
CERTIFICATE OF CORRECTION

PATENT NO. : 5,761,864
DATED : June 9, 1998
INVENTOR(S) : Tadamichi Nonoshita

It is certified that error appears in the above-indentified patent and that said Letters Patent is hereby corrected as shown below:

Column 6, line 54, delete "wail" and insert --wall--.

Column 6, line 55, delete "may".

Column 7, line 1, before "in" insert --as shown--.

Column 8, line 29, delete "winters" and insert --winter,--.

Column 8, line 33, delete "thereof it" and insert --thereof. It--.

Column 8, line 47, delete "Layer" and insert --layer--.

Column 10, line 24, delete "In" and insert --in--.

Column 10, line 24, delete "9(6)" and insert --9(B)--.

UNITED STATES PATENT AND TRADEMARK OFFICE
CERTIFICATE OF CORRECTION

PATENT NO. : 5,761,864
DATED : June 9, 1998
INVENTOR(S) : Tadamichi Nonoshita

It is certified that error appears in the above-indentified patent and that said Letters Patent is hereby corrected as shown below:

```
     Column 10, line 30, delete "wails" and insert
--walls--.

Column 10, line 31, delete "100(C) and insert
--10(C)--.

Column 10, line 41, delete "referring" and insert
--refurring--.

Column 10, line 55, delete "Although In" and insert
--Although, in--.

Column 11, line 49, delete "on" and insert --from--.

Column 11, line 52, delete "The" and insert --the--.

Column 11, line 61, after "with" insert --the--.
```

UNITED STATES PATENT AND TRADEMARK OFFICE
CERTIFICATE OF CORRECTION

PATENT NO. : 5,761,864

DATED : June 9, 1998

INVENTOR(S) : Tadamichi Nonoshita

It is certified that error appears in the above-indentified patent and that said Letters Patent is hereby corrected as shown below:

Column 12, line 19, delete "Is" and insert --is--.

Column 12, line 34, delete "Layers" and insert --layers--.

Column 12, line 37, delete "farther" and insert --further--.

Column 12, line 38, delete "15 in" and insert --15. In--.

Column 12, line 50, insert a comma --,-- after "15".

Column 12, line 58, delete "it".

Signed and Sealed this

Second Day of February, 1999

Attest:

Attesting Officer

Acting Commissioner of Patents and Trademarks